Oct. 31, 1950  J. L. GILSON  2,527,542
METHOD AND APPARATUS FOR FREEZING MATERIALS
Filed Oct. 12, 1944  3 Sheets-Sheet 3

INVENTOR.
Joseph L. Gilson
BY
Popp and Popp
Attorneys

Patented Oct. 31, 1950

2,527,542

UNITED STATES PATENT OFFICE 2,527,542

METHOD AND APPARATUS FOR FREEZING MATERIALS

Joseph L. Gilson, Hartsdale, N. Y., assignor to Van Rensselaer H. Greene, Summit, N. J.

Application October 12, 1944, Serial No. 558,378

19 Claims. (Cl. 62—102)

This invention relates to a method and apparatus for freezing materials, and more particularly to such method and apparatus by which the foods are rapidly frozen through contact with a stream of air moved rapidly over the materials being conveyed through a freezing chamber and maintained at a temperature substantially below the freezing point of the articles being frozen.

The invention is essentially directed to the preservation of fresh fruit, vegetables, fish, poultry, meat and the like in open or packaged form by rapid freezing through direct contact with a low temperature air stream to retain to a high degree the fresh taste, color, aroma, texture and other qualities of the preserved product when subsequently thawed.

One of the principal objects of the invention is to reduce to a minimum the amount of handling required in carrying out the freezing process, of the materials, both before and after freezing, and also of the trays or other carriers used.

Another object of the invention is to reduce to a minimum the alternate cooling and heating of the carriers used in conveying the materials through the freezing chamber, the heating occurring while the carriers are being returned to the inlet end of the freezing chamber for refilling.

Another object of the invention is to provide such a method and apparatus which can be advantageously used in conjunction with a food storage room or hopper for the food storage room located above the ground floor of the building.

Another object is to provide such a process and apparatus which is continuous, that is, the materials to be frozen are continuously fed to the apparatus and the frozen materials continuously removed therefrom.

Another important object is to provide such a method and apparatus in which there is a minimum loss of weight of the product, due to dehydration while being processed.

Another object is to provide such apparatus in which there is no substantial loss of refrigeration either through the loss of cold air at the inlet or outlet of the freezing chamber or through the introduction of damp warm air which would tend to frost the coils.

Another object is to provide such apparatus which employs standard air cooling units which can be purchased at low cost and readily incorporated in the apparatus, thereby to reduce the cost of the apparatus as well as reducing the cost of maintenance as compared with systems in which specially designed cooling and air handling systems are required.

Another most important object of the invention is to provide such a system in which every tray or carrier for the food receives exactly the same treatment as to velocity, volume, humidity and temperature of the air as every other tray, this providing a high degree of uniformity of the frozen product as well as permitting of exact control.

Another object is to provide such apparatus in which the flow of air is crosswise of the product throughout and in which the distribution of this crosswise flow of air is effected by the food itself thereby to obtain high freezing efficiency and uniformity of treatment.

Another object of the invention is to eliminate the necessity for all access doors in connection with the handling of the product.

Another object is to provide a system in which there is a true countercurrent application of the air to the articles being frozen, that is, the application of the coldest air to the coldest leaving product and the warmest air to the warm entering product.

Another object is to treat the product in two zones, the first zone being designed to remove any moisture from the product without frosting up of the cooling coils so that dry cooling coils can be used in the second zone without undue frosting of the dry coils.

Another object is to provide such a two stage process in which two relatively small and independently operated air cooling units can be used for the two stages, this permitting the apparatus to be produced at low cost; rendering it subject to exact control; and facilitating repair and replacement of parts.

Another object is to provide such apparatus in which the floor space occupied is reduced to a minimum.

Figure 1:
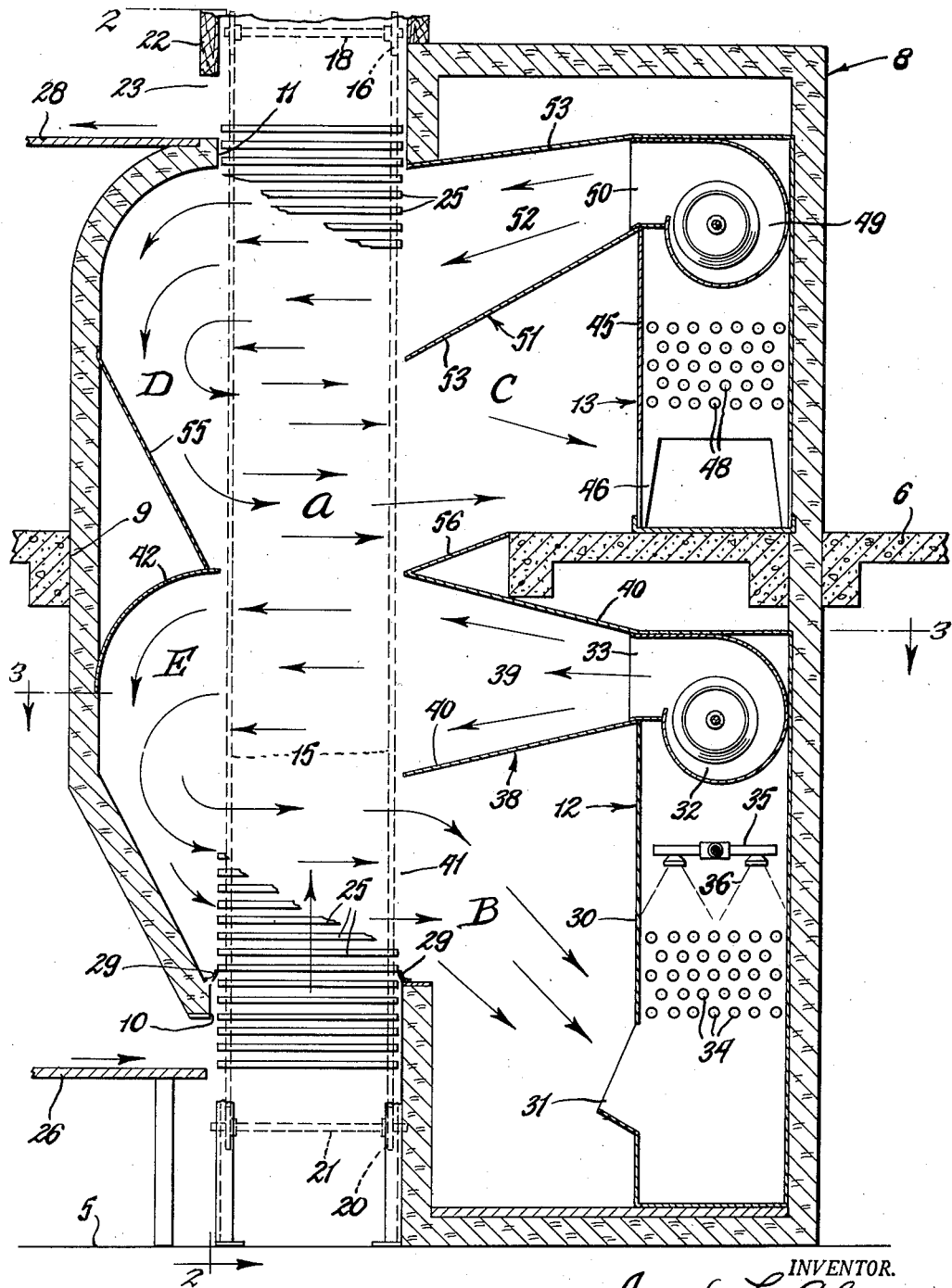
Fig. 1 is a vertical sectional view through apparatus embodying the present invention.
Figure 2:
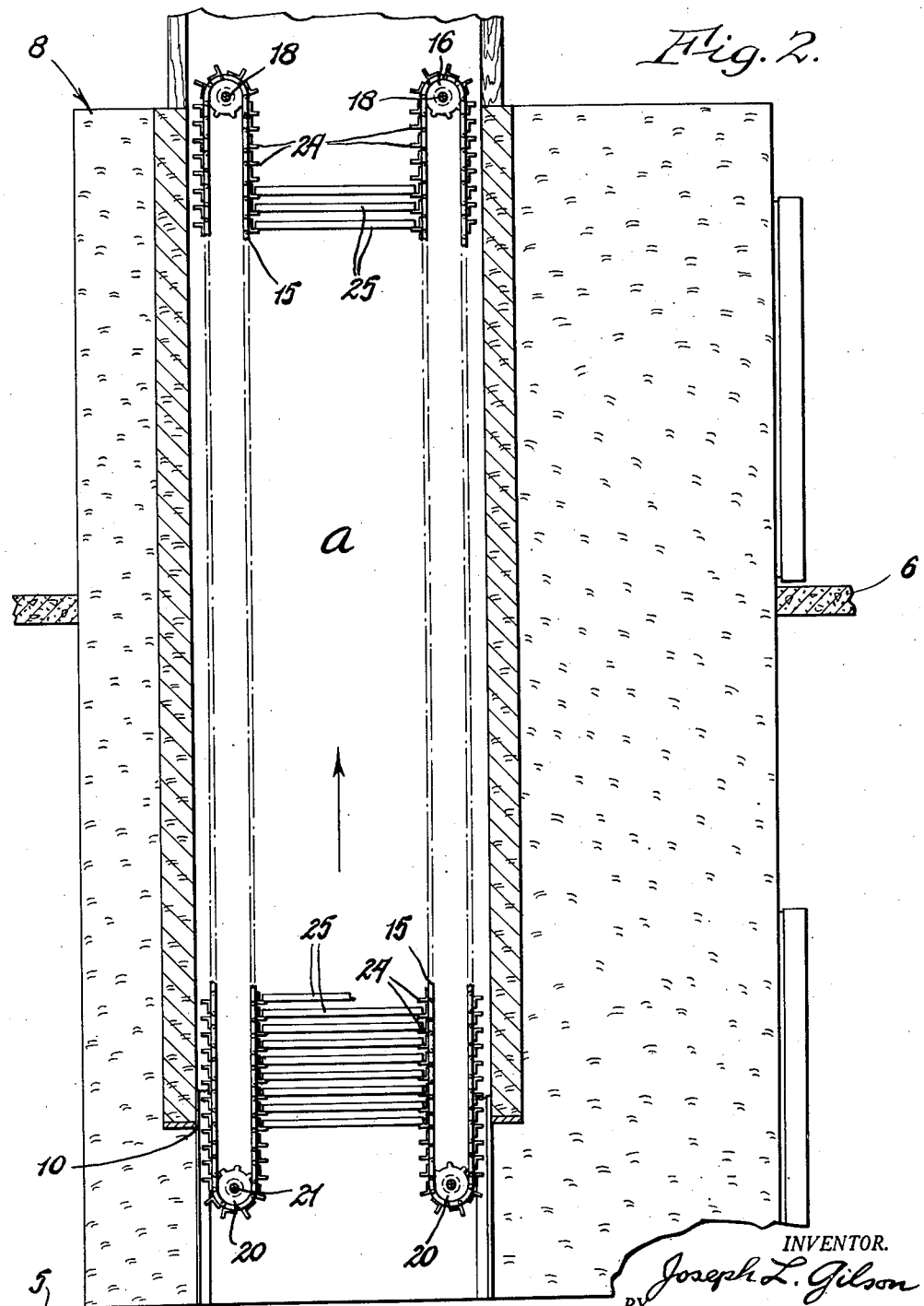
Figs. 2 and 3 are horizontal sectional views, taken on the correspondingly numbered lines of Fig. 1.
Figure 3:
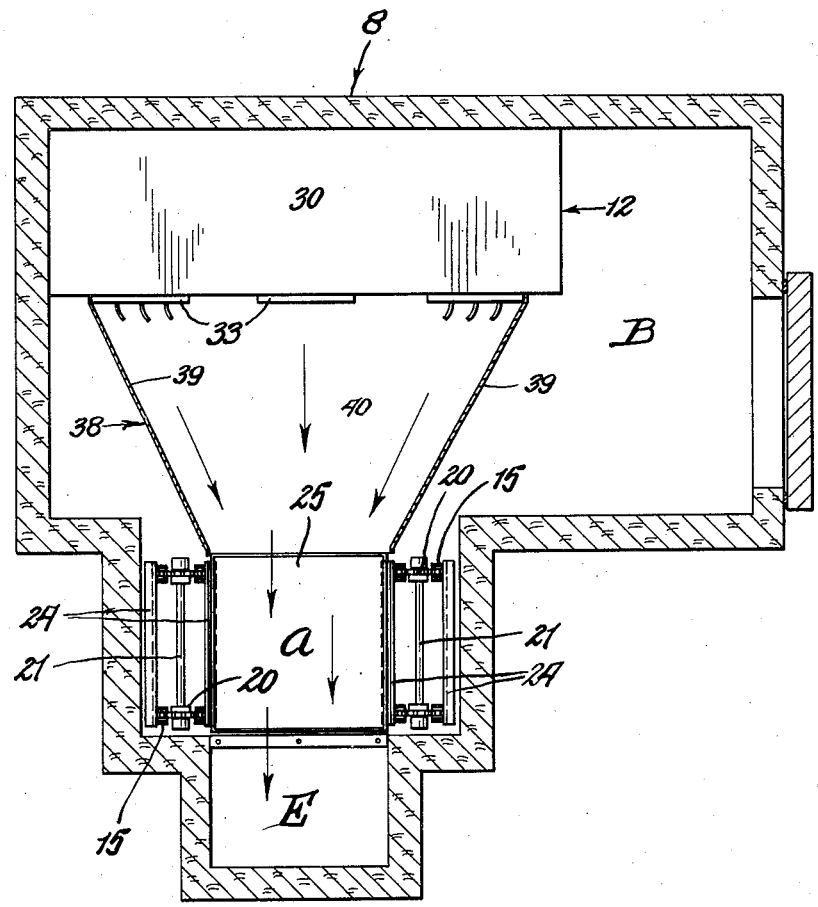

As now practiced, the quick freezing of foods by the application of refrigerated air is effected in a horizontal tunnel type of freezer. Such tunnel type of freezer is usually located on the first floor of the building and is provided with large access doors at its opposite ends through which truckloads of foods are moved into and out of the freezer. The material to be frozen is first loaded on trays and these trays are then loaded on trucks. The access doors are then opened to remove the truck at the far end of the tunnel and to admit the freshly loaded truck to the tunnel, the trucks being progressively moved along the tunnel as each freshly laden truck is introduced into the tunnel.

At the outlet end of the tunnel, the trays are removed from the truck and the frozen food emptied from each tray into a hopper, each emptied tray being replaced on the truck. The frozen material from the hopper is then automatically elevated to the second floor freezer storage room, it having been found undesirable to locate such freezer storage rooms on the ground floor both because of the working floor space lost and also because of the danger of heaving of the floors. The truck with empty trays is then pushed back to the loading station where the trays are removed, refilled and replaced to repeat the cycle of operations.

The freezing apparatus forming the subject of the present invention occupies the first and second floors of the building in which the frozen product is stored, the first floor being indicated at 5 and preferably being at ground level so that the articles to be frozen can be transported directly to the freezing apparatus without intermediate handling and the second floor being indicated at 6.

The apparatus forming the subject of the present invention is arranged within a housing 8 of thermal insulating material, the quick freezing of the products being accomplished at relatively low temperatures and it being hence important to provide adequate insulation and thereby obtain efficient operation. Within the housing 8 is arranged an elevator shaft A which extends through an opening 9 in the second floor and has a horizontal inlet opening 10 at the lower end of the housing 8 and a horizontal outlet opening 11 at the upper end of the housing 8. On one side of the elevator shaft A and on the ground floor 5 the housing 8 encloses a chamber B in which a non-frosting, low temperature cooling unit, indicated generally at 12, is arranged. On the second floor 6 the housing 8 encloses a chamber C which is arranged directly above the chamber B and contains a dry coil, low temperature cooling unit indicated generally at 13. The chambers B and C are in communication with the same side of the elevator shaft A.

On the opposite side of the elevator shaft from the chamber C the housing 8 encloses an air return chamber or passage D which is in communication with this elevator shaft A and which returns the air discharged through the elevator shaft by the cooling unit 13 to the inlet thereof, as hereinafter described. Similarly, below the chamber D, and on the opposite side of the elevator shaft A from the chamber B the housing 8 encloses an air return chamber or passage E which is in communication with this elevator shaft A and which returns the air discharged through the elevator shaft by the non-frosting low temperature cooling unit 12 to the inlet thereof, as hereinafter described.

The articles are frozen while being conveyed upwardly on an elevator which traverses the elevator shaft A and which is preferably constructed as follows:

On each side of the elevator shaft A is arranged a pair of endless chains 15, the upper ends of which pass around sprockets 16 on a pair of horizontal shafts 18 and the lower ends of which pass around sprockets 20 fast to a pair of shafts 21. The upper shafts 18 are arranged above the horizontal outlet opening 11 of the elevator shaft and are preferably housed within a hood 22 having an outlet 23 in one side wall through which the frozen product is removed from the elevator. The lower shafts 21 are arranged below the horizontal inlet opening 10 of the elevator shaft A so as to permit of loading the elevator on the ground floor from a position outside of the housing 8. The shafts 18 and 21 are rotated so that the inner stretches of the chains 15 move upwardly and the outer stretches of these chains move downwardly and along the opposite walls of the elevator shaft A. At each side of the elevator shaft the corresponding pair of chains 15 carry uniformly spaced horizontal flights or slats 24, these flights or slats being shown as being in the form of angle irons and connected to the links of the chains so that while traversing the inner or upwardly moving stretches of the chains 15 they form a series of inwardly projecting shelves or ledges adapted to receive the edges of trays 25 on which the articles to be frozen are loaded. Since counterpart slatted chain structures are provided on opposite sides of the elevator shaft, it will be seen that the trays 25 forming a loading table 26 on the first floor can be slid between the two chain carriers to be supported by a corresponding pair of the flights or slats 24. The trays so loaded on the slatted conveyors are then conveyed upwardly through the inlet opening 10, elevator shaft A and out through the outlet opening 11 at the upper end of the elevator shaft, at which time they can be conveniently removed horizontally from the slatted conveyors through the opening 23, a horizontal slideway 28 being preferably provided below the opening 23 to facilitate this removal. In order to prevent loss of cold air from either the inlet opening 10 or outlet opening 11 for the elevator shaft, and also to prevent the ingress of moist warm air, canvas flaps 29 can be provided around these openings in position to engage the sides of the passing trays 25.

A feature of the invention resides in the fact that standard cooling units can be employed as the cooling units 12 and 13, this greatly reducing the cost of the apparatus since these units can be purchased on the open market at the low cost permitted by their standard form and merely installed in the chambers B and C of the housing 8. The unit 12 treats the warm moist materials entering the lower end of the elevator shaft A and hence is designed to remove moisture from the air which it recirculates over the entering materials as well as to maintain this air at low temperature. To this end the cooling unit B is a spray type cooler contained within a sheet metal casing 30 having an air inlet 31 at its bottom and having a plurality of fans 32 in its top, these fans drawing air from the bottom of the chamber B through the inlet 31 and up through the casing, discharging this air horizontally through outlets 33 at the top of the casing, these outlets being directed toward the elevator shaft A. Within the casing are arranged a series of coils 34 through which a refrigerant at low temperature flows so that the air so drawn through the casing by the fans 32 is cooled. The air drawn in carries moisture from the incoming products and to prevent this moisture from freezing on the coils 34, and to thereby gradually reduce the heat transfer efficiency of these coils as well as to require periodic defrosting, these coils are sprayed from an overhead spray pipe 35 with an antifreeze liquid 36. Usually this liquid collects in the bottom of the spray chamber and is recirculated and in order to prevent excessive dilution of the spray water reconcentration means (not shown) are usually employed. It will be seen, however, that the spray cooler 12 operates both to cool the air and to dehumidify the air.

The outlets 33 from the fans of the spray cooler 12 discharge into a conduit 38 made of four sheet metal walls, the opposite edges of which terminate immediately adjacent the elevator shaft A and in position to discharge all of the air horizontally against the edges of the trays 25 being conveyed upwardly by the elevator. To this end the side walls 39 of this conduit converge from the spray cooler 12 toward the column of trays 25 on the elevator, the vertical edges of these walls 39 terminating immediately adjacent the corners of these trays. The horizontal walls 40 of the conduit 38 diverge from the spray cooler 12 so as to encompass a substantial number of the trays rising on the elevator and it will be noted that the upper wall 40 terminates adjacent the floor line of the second floor 6 while the lower wall 40 of this duct 38 terminates a substantial distance above the inlet opening 10 for the elevator so as to leave a space 41 for the return of the air from the air return chamber E to the inlet 31 of the spray cooler. In order to facilitate the movement of the air, the top of the air return chamber E is formed by a curved baffle 42, the upper edge of which terminates in the same plane as the upper edge of the upper wall 40 of the conduit 39. It will therefore be seen that the air discharged from the outlets 33 of the blower is contracted horizontally by the side walls 39 of the duct 38 to be discharged horizontally against the sides of the rising trays 25 only, and that this air is expanded in a vertical direction by the diverging walls 40 of this duct so as to encompass a substantial number of these rising trays. This air then passes horizontally through the spaces between the trays 25 and is deflected downwardly by the baffle 42 to the lower part of the air return chamber E. From the lower part of this air return chamber E the air passes horizontally through the spaces between the trays 25 on the conveyer into the chamber B where it enters the inlet 31 of the spray cooler 12 and is recirculated past its low temperature cooling coils 34 so as to maintain the desired low temperature of this air.

Since the work of dehumidification is effected by the spray cooler 12, the cooler 13 in the chamber C can be of the dry coil type because no substantial frosting up of its coils will occur. This cooler is shown as comprising an open bottomed casing 45 carried by legs 46 and containing cooling coils 48 through which a low temperature refrigerant is passed. Air from the chamber C is drawn upwardly through the casing 45 by fans 49 which discharge the cold air horizontally toward the elevator shaft A through discharge openings 50. A conduit 51 leads from these discharge openings 50 to the elevator shaft A, this conduit having side walls 52 and vertical walls 53 which converge and diverge, respectively, in the same manner as the corresponding walls of the conduit 38 so as to concentrate the cold air discharged from the dry coil cooler 13 against the edges of the passing trays 25 and over a substantial vertical height thereof.

The top of the air return chamber D is curved so as to deflect the air entering from the spaces between the trays 25 downwardly and the bottom of this air return chamber D is formed by an inclined baffle 55 which serves to direct the stream of air toward the elevator shaft A. To insure a smooth return of the air to the unit 13, a baffle 56 is provided which connects the extremity of the upper wall 40 of the conduit 39 with the floor of the chamber C. It will therefore be seen that the cold air discharged by the dry coil unit 13 through the conduit 51 passes horizontally through the spaces between the trays 25 at the top of the elevator and into the air return chamber D. In this air return chamber this air is deflected downwardly and is then returned horizontally by the baffle 55 to pass between the trays 25 on the corresponding part of the elevator. From these trays the air passes into the chamber C to be thence drawn through the open bottom of the cooling unit 13 in which its temperature is reduced by the cooling coils 48.

The apparatus can be used to rapidly freeze vegetables, fruit, fish, chickens, meat, packaged goods or any other materials. In freezing materials, such as blueberries, each tray is elevated from the inlet 10 to the outlet 11 in about one-half hour and is subjected to a temperature of approximately 5° F. in the first zone, that is, by the spray cooler 12, and to a temperature of from −5 to −10° F. in the second zone, that is, by the dry coil cooler 13. In freezing larger pieces, such as poultry, the speed of the elevator can be cut down; its height increased; or it can be operated in steps so that it can be loaded at, say, hour intervals instead of at ten minute intervals, thereby to enable more efficient use of the operator's time.

The articles to be frozen are brought into the plant on the ground floor 5 and are filled into the trays 25 on the loading table. These trays preferably have screened bottoms so that both sides of the produce are exposed to secure rapid freezing. These trays are then slid onto the successive pairs of flights or slats 24 as they pass the table 26 and are elevated by the slat conveyers upwardly through the opening 10 into the elevator shaft A. On emerging from the opening 10 the trays of warm produce are immediately subjected to the return flow of the air from the spray cooler 12, this air being drawn into the chamber B and inlet 31 of the spray cooler and up past the refrigerating coils 37 by the fans 32, the air being cooled on passing the coils 34 and being discharged through the duct 38 against the next higher group of trays on the elevator. This air is concentrated by the converging side walls of the duct 38 to pass horizontally through the spaces between the several trays, this air being caught by the baffle 42 and deflected downwardly through the air return chamber E where it returns horizontally through the spaces of the incoming trays to rapidly reduce the temperature thereof. In this flow moisture is absorbed from the wash or other water adhering to the produce and also a certain amount of warm moist air enters with the trays. This moist air would ordinarily frost up the coils 34 and progressively reduce their heat transfer efficiency as well as to require shut down for defrosting. To avoid this the cooling unit 12 is preferably of the non-frosting type, these coils being sprayed with an anti-freeze liquid 36 which can be maintained at any desired concentration by any suitable means (not shown).

As the trays 25 move upwardly they pass into the zone of discharge of the duct 38, thereby being subjected to the cold air in the state which it leaves the unit 12. It will be observed that the trays form their own ducts in securing a horizontal flow of air thereover and that a true counterflow movement of the materials relative to the air flow is obtained. That is, the coldest materials are subjected to the coldest air issuing directly from the unit 12 while the entering materials are subjected to the warmer return air. It will particularly be observed, however, that each tray is subjected to exactly the same conditions as every other tray, thereby to secure uniformity in the product. Thus, if any particular stratification should occur under operating conditions it affects all of the trays equally and does not have an accelerating effect on one tray and a retarding effect on another tray.

As each tray moves past the opposing edges of the baffles 42 and 56, this tray forms a seal or closure to isolate the zones of action of the units 12 and 13. Consequently there is no tendency for moist air to enter the chamber C and frost up the dry coils of the unit 13. Further, an exact temperature differential can be maintained in the two zones of freezing.

In the second zone a counter flow movement of the air and materials is again achieved, the trays opposite the bottom part of chamber C being subjected to the relatively warm air from the air return chamber D back through the chamber C to the inlet of the dry coil unit 13 and the trays in the upper part of the shaft being subjected to the cold air as it leaves the unit 13 through the duct 51. It will be observed that the movement of the air from the unit C is substantially the same as the movement of the air from the unit 12, the trays forming their own individual ducts for securing distribution of the air in horizontally flowing layers between the trays and the air passing through the air return chamber and in a reverse direction through the trays to the chamber C, all as illustrated by arrows in Fig. 1.

On emerging from the upper outlet opening 11 of the elevator shaft, the trays of frozen material are drawn forwardly from the flights or slats 24 onto the guideway 28 from which they can be conveniently dumped into a conveyer which transports the frozen product to the freezer storage room or hopper leading to the freezer storage room. The empty trays can then be dropped in a chute (not shown) which conveys them, by gravity, back to the feeding table 26. The emptied flights or slats of the conveyer chains 15 continue upwardly, over the sprockets 16 and enter the descending outer stretches of the chains 15. It will be particularly observed, however, that all parts of the conveyer, including the return stretches, are located in the elevator shaft A, and hence are continuously maintained at a low temperature, this being of particular advantage over horizontal tunnels using trucks which warm up while being unloaded, transferred and reloaded.

Particularly as compared with the horizontal tunnel type of quick freezers now in use it will be seen that the present invention provides a number of very distinct advantages. Thus with the tunnel type of freezer the material must first be loaded on trays and then the trays loaded into trucks. Each truck must then be wheeled up to the tunnel and the access doors at both ends of the tunnel must be opened to permit the loaded truck to be moved in and the finished truck to be removed, the one truck replacing the other. This requires the expenditure of a great deal of manual labor as well as a loss of refrigerated air from both ends of the tunnel and the admission of a large quantity of warm damp air to frost the coils. At the outlet end of the tunnel the trays must be removed from the trucks and emptied into a hopper from which hopper they are elevated to the hopper of the freezer storage room. As each tray is removed from the truck and emptied it is replaced on the truck and the truckload of empty trays is then wheeled back to the loading station. At this loading station each tray must again be removed from the truck, refilled and replaced. During this unloading, transfer and reloading of the trucks and trays they naturally warm up and are required to be cooled in the tunnel.

With the apparatus forming the subject of the present invention the trays are loaded, and can be loaded automatically, on the first floor and fed directly to the conveyer. As the trays move upwardly through the elevator shaft the product is frozen and at the top the trays are withdrawn, dumped into a conveyer, which process can be automatic, and dropped into a chute which returns the empty trays to the loading table 26 for immediate refilling. The trays form their own valves at the inlet and outlet ends of the elevator shaft A to prevent loss of cold air or ingress of any substantial amount of warm damp air and each tray is subjected to room temperatures for a very short period. Further, the trays have very little bulk as compared with a truck.

Further, with the present apparatus the air flows crosswise of the product and the distribution of the air across the elevator shaft is effected by the food on the trays, this avoiding the necessity of special baffle arrangements. If any inequality of air velocity develops, such inequality is compensated for by the fact that during the upward travel of the trays every tray is subjected to exactly the same treatment as to volume, velocity and temperature of air encountered. It will further be observed that a true countercurrent application of air to the food is obtained as previously set forth and that by the two phase or two zone treatment, a greater uniformity of treatment is obtained. In particular, it will be noted that each cooling unit 12, 13 is completely independent in its action from the other unit so that any increase in load in one zone does not affect the operating temperature of the other zone. Further, with the two zone cooling as shown, the removal of moisture can be effected exclusively in the first stage by a non-frosting type of cooler and the unit in the second stage can be a simple dry coil unit. It will also be noted that the units 12 and 13 can be any type of standard blower type of cooling unit and can be purchased on the open market, this avoiding the necessity for expensively tailored cooling equipment. Such standard units could not be used with horizontal tunnel type quick freezing units because of their height.

It will particularly be noted that the apparatus provides continuous processing of small charges of the product to be cooled. As a result the temperature of the material on each tray is reduced uniformly to follow a smooth curve from the time it enters to the time it leaves the elevator shaft. In contrast to this the admission of a truckload of material into a tunnel type freezer slows up the entire operation of freezing all along the tunnel, due to the large instantaneous load which is impressed. As a result the freezing in a tunnel type freezer proceeds in steps, and the freezing instead of following a smooth curve, flattens out each time a fresh truckload is admitted to the tunnel. Therefore, with the present process more uniform conditions can be maintained and more uniform results achieved, this being particularly important with freezing foodstuffs which are sensitive and which require careful control.

The elevator equipment is always in the tunnel, except for a very short space of travel which can be protected to prevent warming up of the elevator equipment and further this equipment is very materially less bulky than the trucks used with tunnel freezers.

As previously indicated, one of the principal features of the invention is that there is a minimum dehydration of the product itself and very much less dehydration as compared with tunnel freezers. The product is, of course, generally washed before being frozen and the adherent wash water, as well as the moist air admitted, provides a dehumidification load on the cooling unit 12 in the first zone so as to make it desirable to use a non-frosting type of cooling unit in this zone as previously pointed out. Because, however, of the small quantity of produce introduced each time a relatively small trayful of food enters the elevator shaft A and also because such small quantity of produce introduced on each tray is rapidly reduced in temperature to a non-dehydrating temperature differential between it and the air, there is a negligible loss, and at times no loss, due to the dehydration of the product itself. Such loss is undesirable not only because of the resulting loss of weight, but also because such loss results in the product being shriveled when thawed and hence becoming commercially less desirable.

The amount of moisture which will leave the food as it is being frozen is governed by the temperature difference between the air which freezes the product and the temperature of the product itself. The lower this temperature difference can be kept, the less will be the dehydration of the product itself. In any truck type of tunnel freezer a complete truckload of warm food is introduced and a wide temperature difference is maintained between the air and the food until the entire truckload of food is reduced to a temperature approaching that of the air, this requiring a substantial length of time and resulting in a substantial dehydration of the food. This difference is, of course, reduced between the periods of truck introduction, but nevertheless after introduction each truck has this wide temperature difference. The very fact that the temperatures of the air vary up and down as the trucks are introduced also results in dehydration losses.

In contrast with this, by the practice of the present invention, only a single small trayful of the food is introduced at a time and each tray after entry is quickly brought down to a condition where the temperature difference is materially less. For example, in a tunnel type freezer trucks are usually introduced every six or seven minutes and this six or seven minute period is required to bring the product down to a reasonable temperature difference condition. With the present process for the same product a new tray comes into the air blast at the bottom of the elevator shaft every thirty-six seconds and temperature readings of the air coming off the third or fourth tray from the bottom indicate that in something less than two minutes this undesirable wide temperature difference is eliminated.

Further, the same rapid cooling of the small and spread out trays of produce is repeated all the way up through the elevator shaft A, each tray being rapidly brought to a minimum temperature difference as it advances through the shaft. The net result is that the overall effect of temperature difference is minimized almost to a perfect condition as regards the application of cold air to the food to be frozen.

It will further be particularly observed that the equipment forming the subject of the present invention takes very little floor space, particularly on the first floor where space is at a premium and it will also be noted that the equipment conveniently receives the materials to be frozen on the first floor where they are received in the plant and delivers the frozen product on the second floor where good practice requires that the freezing storage room be located.

I claim as my invention:

1. In freezing apparatus of the character described, an elevator adapted to convey a succession of the articles to be frozen in an upward direction, means at one station at the bottom of said elevator for loading said articles on said elevator, means at another station at the top of said elevator for unloading said articles from said elevator, and means between said stations and discharging a freezing medium transversely across the path of the articles being conveyed upwardly by said elevator and to impinge on said articles.

2. In freezing apparatus of the character described, means providing a freezing chamber having an inlet opening at its lower end and an outlet opening at its upper end, a conveyer adapted to convey a succession of the articles to be frozen upwardly in through said inlet opening, up through said chamber and out through said outlet opening, said conveyer being adapted to be loaded at a station outside of said chamber and adjacent said inlet opening and to be unloaded at a station outside of said chamber and adjacent said outlet opening, and means within said chamber and blowing a current of cold air across the path of the articles being conveyed by said conveyer.

3. In freezing apparatus of the character described, a plurality of trays, means providing a freezing chamber, an elevator passing through said chamber and through inlet and outlet openings provided therein and adapted to convey a succession of said trays in a horizontal position in through said inlet opening, vertically through said chamber and out through said outlet opening, said elevator being adapted to be loaded with said trays filled with the articles to be frozen at a station outside of said chamber and adjacent said inlet opening and unloaded at a station outside of said chamber and adjacent said outlet opening, and means within said chamber and blowing a current of cold air across the path of the trays being conveyed by said elevator, said trays being of substantially the same size and shape as at least one of said openings thereby to successively provide closures therefor to prevent leakage of air therethrough.

4. In freezing apparatus of the character described, a plurality of trays, means providing a freezing chamber having a vertical elevator shaft extending therethrough and having inlet and outlet openings provided through the walls of said chamber at the lower and upper ends, respectively, of said elevator shaft, an elevator arranged in said shaft and projecting through said openings and adapted to convey a succession of said trays in horizontally arranged, vertically spaced relation upwardly through said openings and chamber, said elevator being adapted to be loaded with said trays filled with the articles to be frozen at a station outside of said chamber and below said inlet opening and unloaded at a station outside of said chamber and above said outlet opening, and means within said chamber and blowing a current of cold air across the path of the trays being conveyed by said elevator.

5. In freezing apparatus of the character described, a plurality of trays, means providing a freezing chamber having a vertical elevator shaft extending therethrough and with inlet and outlet openings provided through the walls of said chamber at the lower and upper ends, respectively, of said elevator shaft, an elevator arranged in said shaft and projecting through said openings and adapted to convey a succession of said trays in horizontally arranged, vertically spaced relation upwardly through said openings and chamber, said elevator comprising an endless conveyer arranged at each side of said shaft and each including a wheel below said inlet opening, a wheel above said outlet opening, an endless flexible conveyer passing around said wheels and flights on said endless conveyers and forming horizontal supports for the corresponding edges of said trays, said flights of both conveyers being adapted to be loaded with said trays filled with the articles to be frozen at a station outside of said chamber and below said inlet opening and unloaded at a station outside of said chamber and above said outlet opening, and means within said chamber and blowing a current of cold air across the path of the trays being conveyed by said elevator.

6. In freezing apparatus of the character described, a plurality of trays, means providing a freezing chamber having a vertical elevator shaft extending therethrough and with inlet and outlet openings provided through the walls of said chamber at the lower and upper ends, respectively, of said elevator shaft, an elevator arranged in said shaft and projecting through said openings and adapted to convey a succession of said trays in horizontally arranged, vertically spaced relation upwardly through said openings and chamber, said elevator comprising an endless conveyer arranged at each side of said shaft and each including a wheel below said inlet opening, a wheel above said outlet opening, an endless flexible conveyer passing around said wheels and flights on said endless conveyers and forming horizontal supports for the corresponding edges of said trays, a horizontal feeding table outside of said chamber and adjacent said inlet opening and arranged in line with the flights of said two conveyers so that loaded trays on said table can be slid onto said flights from said table, a horizontal guideway outside of said chamber and adjacent said outlet opening and arranged in line with the flights of said two conveyers so that the trays on said elevator can be slid from said flights onto said guideway, and means within said chamber and blowing a current of cold air across the path of the trays being conveyed by said elevator.

7. In freezing apparatus of the character described, means providing a freezing chamber, an elevator passing through said chamber and through inlet and outlet openings for said chamber and adapted to convey a succession of the articles to be frozen in through said inlet opening, vertically through said chamber and out through said outlet opening, said elevator being adapted to be loaded at a station outside of said chamber and adjacent said inlet opening and to be unloaded at a station outside of said chamber and adjacent said outlet opening, means dividing said chamber into two compartments through which the articles conveyed by said elevator successively pass, a cooler in one of said compartments and including a fan, cooling coils and means directing the air discharged by said fan transversely across the path of the articles being conveyed by said elevator, and a second cooler in the other of said compartments and including a fan, cooling coils and means directing the air discharged by said fan transversely across the path of the articles being conveyed by said elevator through said other of said compartments, the air delivered by said coolers being differently conditioned.

8. In freezing apparatus of the character described, means providing a freezing chamber, an elevator passing through said chamber and through inlet and outlet openings for said chamber and adapted to convey a succession of the articles to be frozen in through said inlet opening, vertically through said chamber and out through said outlet opening, said elevator being adapted to be loaded at a station outside of said chamber and adjacent said inlet opening and to be unloaded at a station outside of said chamber and adjacent said outlet opening, means dividing said chamber into two compartments through which the articles conveyed by said elevator successively pass, a cooler in the entering compartment and including a fan, cooling coils, means for spraying an antifreeze liquid over said coils to prevent frosting thereof and means directing the air discharged by said fan transversely across the path of the articles being conveyed through said entering compartment, and a second cooler in the leaving compartment and including a fan, cooling coils and means directing the air discharged by said fan transversely across the path of the articles being conveyed by said elevator through said leaving compartment.

9. In freezing apparatus of the character described, a plurality of trays, means providing a freezing chamber having a vertical elevator shaft extending therethrough and having inlet and outlet openings provided through the walls of said chamber at the opposite ends of said elevator shaft, an elevator arranged in said shaft and projecting through said openings and adapted to convey a succession of said trays in horizontally arranged, vertically spaced relation through said openings and chamber, said elevator being adapted to be loaded with said trays filled with the articles to be frozen at a station outside of said chamber and adjacent said inlet opening and unloaded at a station outside of said chamber and adjacent said outlet opening, said freezing chamber including a compartment arranged alongside said elevator shaft and in communication therewith and an air return compartment arranged along the opposite side of said elevator shaft and in communication therewith, a cooler in said first compartment and including a fan, cooling coils and means directing the air discharged by said fan horizontally against the opposing edges of the trays on said elevator and leaving said chamber, said discharged air passing horizontally across said leaving trays to the corresponding end of said air return compartment and thence passing along said air return compartment to the edges of the trays entering said chamber, said return air thence passing horizontally across said entering trays to said first compartment for recirculation over said cooling coils by said fan.

10. In freezing apparatus of the character described, a plurality of trays, means providing a freezing chamber having a vertical elevator shaft extending therethrough and having inlet and outlet openings provided through the walls of said chamber at the lower and upper ends, respectively, of said elevator shaft, an elevator arranged in said shaft and projecting through said openings and adapted to convey a succession of said trays in horizontally arranged, vertically spaced relation upwardly through said openings and chamber, said elevator being adapted to be loaded with said trays filled with the articles to be frozen at a station outside of and below said inlet opening and unloaded at a station outside of said chamber and above said outlet opening, means dividing said chamber into two compartments through which the trays conveyed by said elevator successively pass, each of said compartments including a first sub-compartment arranged alongside of said elevator shaft and in communication therewith and a second air return sub-compartment arranged along the opposite side of said elevator shaft and in communication therewith, a cooler in said first sub-compartment and including a fan, cooling coils and means directing the air discharged by said fan horizontally against the opposing edges of the trays on said elevator and leaving the corresponding compartment, said discharged air passing horizontally across said leaving trays to the corresponding end of said air return sub-compartment and thence passing downwardly through said air return sub-compartment to the edges of the trays entering the corresponding compartment, said return air thence passing horizontally across said entering trays to said first sub-compartment for recirculation over said cooling coils by said fan.

11. In freezing apparatus of the character described, means providing a freezing chamber through which the articles to be frozen are conveyed from one end thereof to the other, means dividing said chamber into two compartments through which the articles successively pass, a cooler in the entering compartment and including a fan, cooling coils, means for spraying an antifreeze liquid over said coils to prevent frosting thereof and means directing the air discharged by said fan transversely across the path of the articles through said entering compartment to maintain high humidity therein, and a second cooler in the leaving compartment and including a fan, dry cooling coils and means directing the air discharged by said fan transversely across the path of the articles through said leaving compartment.

12. The method of freezing articles which comprises spreading said articles in horizontal layers, moving said horizontal layers vertically through a predetermined path, blowing a stream of cold air horizontally across said layers and through the spaces therebetween, and deflecting the air leaving said layers to travel countercurrent thereto and to enter and pass horizontally through the spaces between layers following those against which said stream of cold air is initially blown.

13. In freezing apparatus of the character described, a plurality of trays, means providing a freezing chamber, an elevator arranged to convey a succession of said trays in spaced relation each in a horizontal position vertically upwardly in said chamber, means guiding a succession of said trays in a horizontal plane into the lower end of said elevator to be elevated thereby, a horizontal slideway at the top of said elevator in position to receive the trays from said elevator in a horizontal plane, and means at one side of said elevator and blowing a current of cold air against a plurality of the passing trays to cross the path thereof.

14. In freezing apparatus of the character described, means providing a freezing chamber, an elevator arranged to convey a succession of the articles to be frozen vertically through said chamber, means dividing said chamber into two compartments through which the articles conveyed by said elevator successively pass, a cooler in one of said compartments and including a fan, cooling coils and means directing the air discharged by said fan transversely across the path of the articles being conveyed by said elevator, and a second cooler in the other of said compartments and including a fan, cooling coils and means directing the air discharged by said fan transversely across the path of the articles being conveyed by said elevator through the other of said compartments, the air delivered by said coolers being differently conditioned.

15. In freezing apparatus of the character described, a plurality of trays, means providing a freezing chamber and having a vertical elevator shaft therein, an elevator adapted to convey a succession of said trays in horizontally arranged, spaced relation vertically upwardly through said chamber, said freezing chamber including a compartment arranged alongside said elevator shaft and in communication therewith and an air return compartment arranged along the opposite side of the elevator shaft and in communication therewith, a cooler in said first compartment and including a fan, cooling coils and means directing the air discharged by said fan horizontally against the opposing edges of the trays on an upper part of said elevator, said discharged air passing horizontally across said trays on said upper part of said elevator and thence passing downwardly along said air return compartment to the edges of the trays on a lower part of said elevator, said return air thence passing horizontally across said trays on said lower part of said elevator to said first compartment for recirculation over said coils by said fan.

16. In freezing apparatus of the character described, a plurality of trays, means providing a freezing chamber having a vertical elevator shaft therein, an elevator arranged in said shaft and adapted to convey a succession of said trays in horizontally arranged, vertically spaced relation upwardly through said chamber, means dividing said chamber into two compartments through which the trays conveyed by said elevator successively pass, each of said compartments including a first sub-compartment arranged alongside of said elevator shaft and in communication therewith and a second air return sub-compartment arranged along the opposite side of said elevator shaft and in communication therewith, a cooler in each of said first sub-compartments and including a fan, cooling coils and means directing the air discharged by said fan horizontally against the opposing edges of the trays on that part of said elevator in an upper part of the corresponding compartment, said discharged air passing horizontally across said trays on said elevator to the upper end of said air return sub-compartment and thence passing downwardly through said air return sub-compartment to the edges of the trays on that part of said elevator in the lower part of the corresponding compartment, said return air thence passing horizontally across said trays on said elevator to said first subcompartment for recirculation over said cooling coils by said fan.

17. The method of freezing articles which comprises spreading said articles in horizontal layers, moving said horizontal layers vertically in a procession through a predetermined path, blowing a stream of cold air horizontally across the edges of a group of said layers and through the spaces therebetween, and deflecting the air leaving the opposite edges of said group of layers to travel countercurrent thereto and to enter and pass horizontally through the spaces between a group of layers following those against which said stream of cold air is initially blown.

18. In freezing apparatus of the character described, a plurality of trays, means providing a freezing chamber, means providing a vertical elevator shaft in said chamber, an elevator arranged in said shaft and adapted to convey a succession of said trays in horizontally arranged, vertically spaced relation upwardly, said elevator comprising an endless conveyer arranged at each side of said shaft and each including a wheel adjacent the bottom of said shaft, a wheel adjacent the top of said shaft, an endless flexible conveyer passing around said wheels and slats on said endless conveyers and forming horizontal supports for the corresponding edges of said trays, said slats being adapted to be loaded with said trays filled with the articles to be frozen at the bottom of said shaft and unloaded at the top of said shaft and means within said chamber and blowing a current of cold air across the path of the trays being conveyed by said elevator.

19. In a freezing apparatus of the character described, the combination of a plurality of material-supporting trays; an enclosing structure including a vertical shaft with inlet and outlet openings for material-carrying trays, one at the top and the other at the bottom of the shaft; means adapted to advance a succession of horizontal superposed trays in spaced relation through said shaft; means related to said enclosing structure and forming an air-cooling chamber at one side of said shaft and in communication therewith and an air return passage arranged along the opposite side of said shaft and in communication therewith; a cooling unit in said air cooling chamber comprising refrigerating coils and means for directing air in contact with said refrigerating coils; and a fan arranged to circulate air in a closed path over said coils, then across the shaft through one portion of the series of spaced trays to the air return passage, and from the return passage back across the shaft through another portion of the series of spaced trays, the flow in the return passage being opposite to the direction of advance of the trays.

JOSEPH L. GILSON.

REFERENCES CITED

The following references are of record in the file of this patent:

UNITED STATES PATENTS

| Number | Name | Date |
| --- | --- | --- |
| 1,835,881 | Kolbe | Dec. 8, 1931 |
| 1,867,546 | Baer | July 19, 1932 |
| 1,958,890 | Foss et al. | May 15, 1934 |
| 2,237,257 | Finnegan | Apr. 1, 1941 |
| 2,265,858 | Reynoldson | Dec. 9, 1941 |
| 2,300,229 | Knowles | Oct. 27, 1942 |